(12) United States Patent
Han et al.

(10) Patent No.: US 9,870,595 B2
(45) Date of Patent: Jan. 16, 2018

(54) METHOD FOR PROPOSING LANDMARK

(71) Applicant: GWANGJU INSTITUTE OF SCIENCE AND TECHNOLOGY, Gwangju (KR)

(72) Inventors: Jong Hyun Han, Gwangju (KR); Hyunju Lee, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 381 days.

(21) Appl. No.: 14/686,198

(22) Filed: Apr. 14, 2015

(65) Prior Publication Data

US 2015/0294427 A1    Oct. 15, 2015

(30) Foreign Application Priority Data

Apr. 14, 2014   (KR) .................. 10-2014-0044481

(51) Int. Cl.
*G06F 17/30* (2006.01)
*G06Q 50/14* (2012.01)
*G01C 21/26* (2006.01)
*G01C 21/36* (2006.01)

(52) U.S. Cl.
CPC ............. *G06Q 50/14* (2013.01); *G01C 21/26* (2013.01); *G01C 21/3679* (2013.01); *G06F 17/30598* (2013.01)

(58) Field of Classification Search
None
See application file for complete search history.

(56) References Cited

U.S. PATENT DOCUMENTS

2010/0205176 A1*  8/2010  Ji ..................... G06K 9/00704
                                                   707/737

* cited by examiner

Primary Examiner — Belix M Ortiz Ditren
(74) Attorney, Agent, or Firm — Hauptman Ham, LLP

(57) ABSTRACT

Disclosed herein is a method for proposing landmarks including: extracting digital images photographed in a country or area for a user to visit; analyzing the weight of each item of a user profile containing travel information of the user using the digital images; prioritizing landmarks based on the weight of each item of the user profile in landmark data extracted in a country to visit; and clustering the landmarks to produce cluster landmarks including additional clustered landmarks and proposing the cluster landmarks to the user. Thus, according to the present invention, when planning a trip, a user can be proposed travel spots which are suitable for the user's travel conditions and are considered as landmarks in an area to visit without need for retrieval of information from a vast database.

9 Claims, 3 Drawing Sheets

METHOD FOR PROPOSING LANDMARK

CROSS REFERENCE TO RELATED APPLICATION

This application claims the benefit of Korean Patent Application No. 10-2014-0044481, filed on Apr. 14, 2014, entitled "METHOD FOR PROPOSING LANDMARK", which is hereby incorporated by reference in its entirety into this application.

BACKGROUND

1. Technical Field

Embodiments of the invention relate to a method for proposing landmarks, and more particularly, to a method for proposing landmarks, in which landmarks are extracted according to user information to propose the most suitable landmark.

2. Description of the Related Art

Recently, as smartphones become popular all over the world, use of digital images captured using built-in cameras of the smartphone is increasing and the images are posted on the Internet and SNS through mutual communication. Photos on a variety of topics are updated in real time all over the world. With increasing capacity of digital storage media, such digital images are stored in a server database to allow sharing between users.

When planning a trip to a certain country, a user tends to choose destinations with priority given to symbolic places or buildings of the country, or based on a specific travel theme such as visiting museums, watching night views, and the like. Here, a user generally makes a choice on the basis of digital images rather than written information.

To take a trip to a domestic area or a foreign country, a user usually connects to a website containing digital images of a destination and retrieves data therein. However, it takes long time to search a vast amount of digital image data. Thus, there is a problem in that a user has much difficulty in selecting or being proposed spots meeting user travel conditions.

BRIEF SUMMARY

Embodiment of the present invention have been conceived to solve such problems in the art and provide a method for proposing landmarks, which prioritizes travel spots suitable for a user based on a user profile including home address, season to visit, time of day to visit and travel theme, and proposes prioritized travel spots to the user, when the user plans a trip.

In accordance with one aspect of the present invention, a method for proposing landmarks may include: extracting landmarks in a country or area for a user to visit using digital images photographed in the country or the area; analyzing the weight of each item of a user profile; prioritizing landmarks based on the weight of each item of the user; and clustering the landmarks to produce clustered landmarks including additional clustered landmarks and proposing the clustered landmarks to the user.

In addition, extracting landmarks in a country or area for a user to visit may include: dividing an area to visit into sectors having a predetermined size; and performing landmark scoring based on the frequency of the extracted digital images for each sector.

The user profile may include at least one of information on a user home address, information on a season to visit, and information on a time of day to visit.

According to embodiments of the present invention, the method can propose travel spots, which suit user travel conditions and are considered as landmarks in an area to visit without retrieval of information from a vast database, to users when planning trips.

In addition, searching travel spots based on a user profile allows a user to be proposed places containing contents worth seeing for foreign visitors when the user plans an overseas trip; preferentially proposed places holding various events, such as festivities or sports events, based on a season to visit; and preferentially proposed places with a wonderful night view, and the like, based on a time of day to visit.

Furthermore, the method according to the embodiments of the invention has an advantage in that a user can be proposed other landmarks with a similar concept, distributed near the proposed landmarks, thereby allowing the user to visit all of the proposed landmarks within a given travel time.

DETAILED DESCRIPTION

Hereinafter, exemplary embodiments of the invention will be described in detail with reference to the accompanying drawings. It should be understood that the present invention is not limited to the following embodiments and may be embodied in different ways. Detailed descriptions of functions or features known in the art will be omitted for clarity.

Embodiments of the present relate to a method for proposing landmarks to a user. A landmark is a conspicuous or distinguishing landscape feature marking a site or location and is thus suitable as a target for identifying a certain area, such as the N Seoul Tower, the Sungnyemun Gate, and the like. Such features of landmarks are obtained from their shapes, contrast against the background, excellence in spatial placement, and the like.

Every country has buildings or famous cultural assets which are used to promote the country. In a modern sense, representative monuments considered as symbols of certain areas, such as the Eiffel Tower in France, the Statue of Liberty in New York, and a pyramid in Egypt can be referred to as landmarks. Embodiments of the present invention are aimed at proposing such landmarks to a user who selects spots to visit upon planning a trip, thereby allowing the user to enrich travel content and easily make travel plans.

As used herein, a landmark may be defined as a digital image of a certain place. With the worldwide use of smartphones, digital images contain geo-tag information. Such digital images are posted to allow access of users around the world through an online community, such as an SNS.

In addition, on a certain Internet site, digital images are uploaded and shared by people on tour or people who have returned from their travels. In the embodiments, it is possible to build a database based on data stored in a server of the website. Such a database may contain digital images of tourist spots all over the world, and information such as places, dates, and time at or on which the digital images were photographed, are extracted by geo-tags of the digital images. The digital images may include certain places in a certain country for a user to visit, i.e. representative buildings, natural environments, cultural programs, and the like.

In the method according to the embodiments of the invention, a user can be proposed a country meeting user travel conditions or landmarks of a certain place when planning domestic travel through a user interface based on information of the database constructed as above. Hereinafter, the method for proposing landmarks according to the embodiments of the invention will be described in detail.

Figure 1:
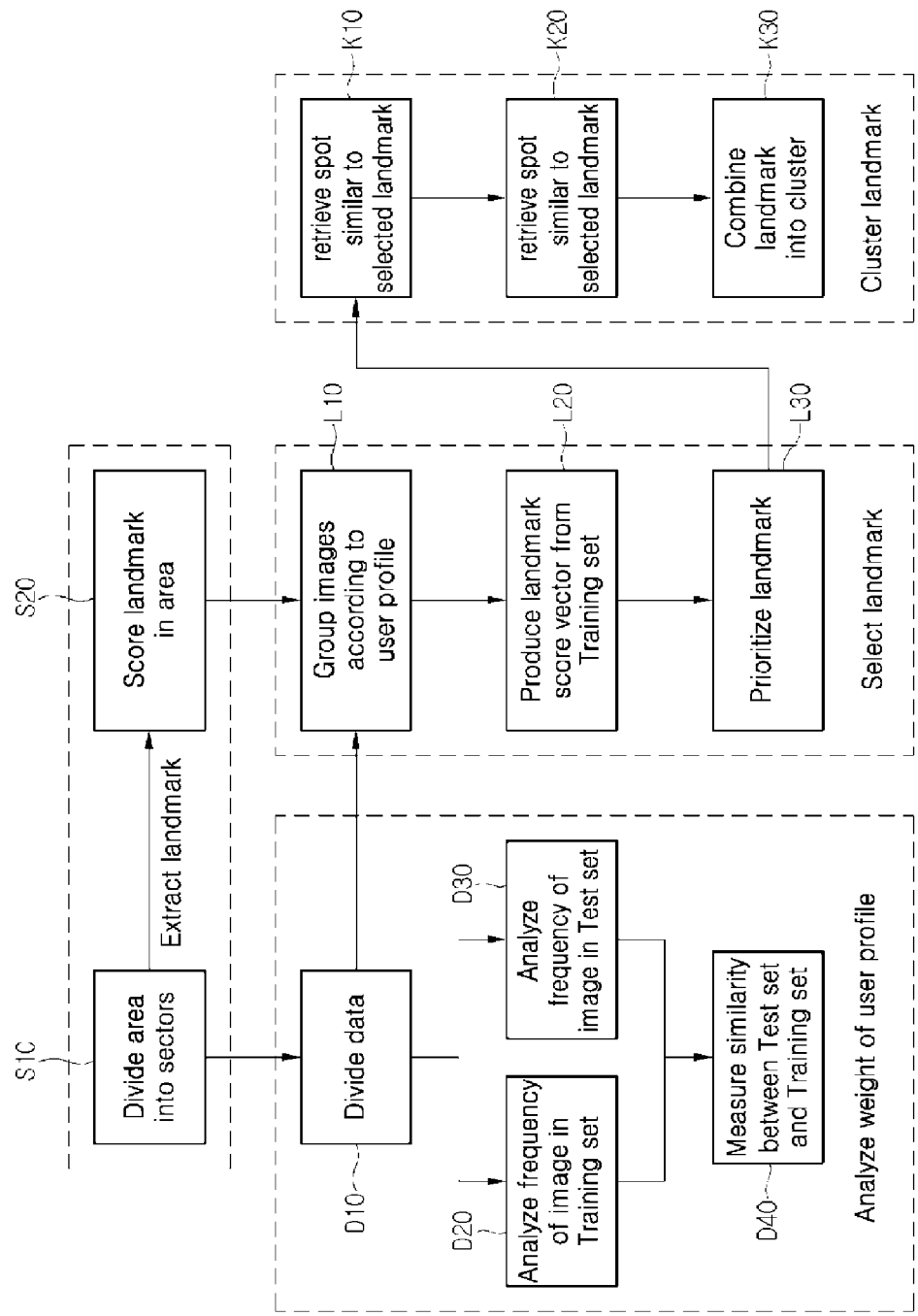
FIG. 1 is a flowchart showing a method for proposing landmarks according to one embodiment of the present invention.

FIG. 1 is a flowchart showing a method for proposing landmarks according to one embodiment of the present invention.

Referring to FIG. 1, the method for proposing landmarks according to the embodiment of the invention may include extracting landmarks in a country or area to visit, analyzing the weight of each item of a user profile, selecting landmarks based on the user profile, and clustering the landmarks.

In the embodiment, a user is not proposed a landmark appearing most frequently in a country or area to visit, and proposed priorities derived from landmarks analyzed based on the user profile.

The user profile may include a user home address. In other words, whether a country chosen by the user is a foreign country or a home country is determined, whereby scoring for prioritizing travel spots can be changed.

In addition, the user profile may include information on a season to visit. When a user previously inputs information on a season to visit selected from spring, summer, fall, and winter, priorities of landmarks proposed to the user in a country to visit can be changed based on the season information.

Further, the user profile may include information on a time of day to visit a certain place. In other words, when a user previously inputs information on when the user will visit the place among morning, afternoon, evening, and night, the user can be proposed a landmark with highest priority for each time of day in a country to visit.

Hereinafter, the method for proposing landmarks according to the embodiment of the invention will be described in detail.

First, the method for proposing landmarks includes extracting landmarks in a country or area for a user to visit. Extracting landmarks may include dividing the country or area to visit into sectors (S10), and scoring landmarks for each sector (S20).

Figure 2:
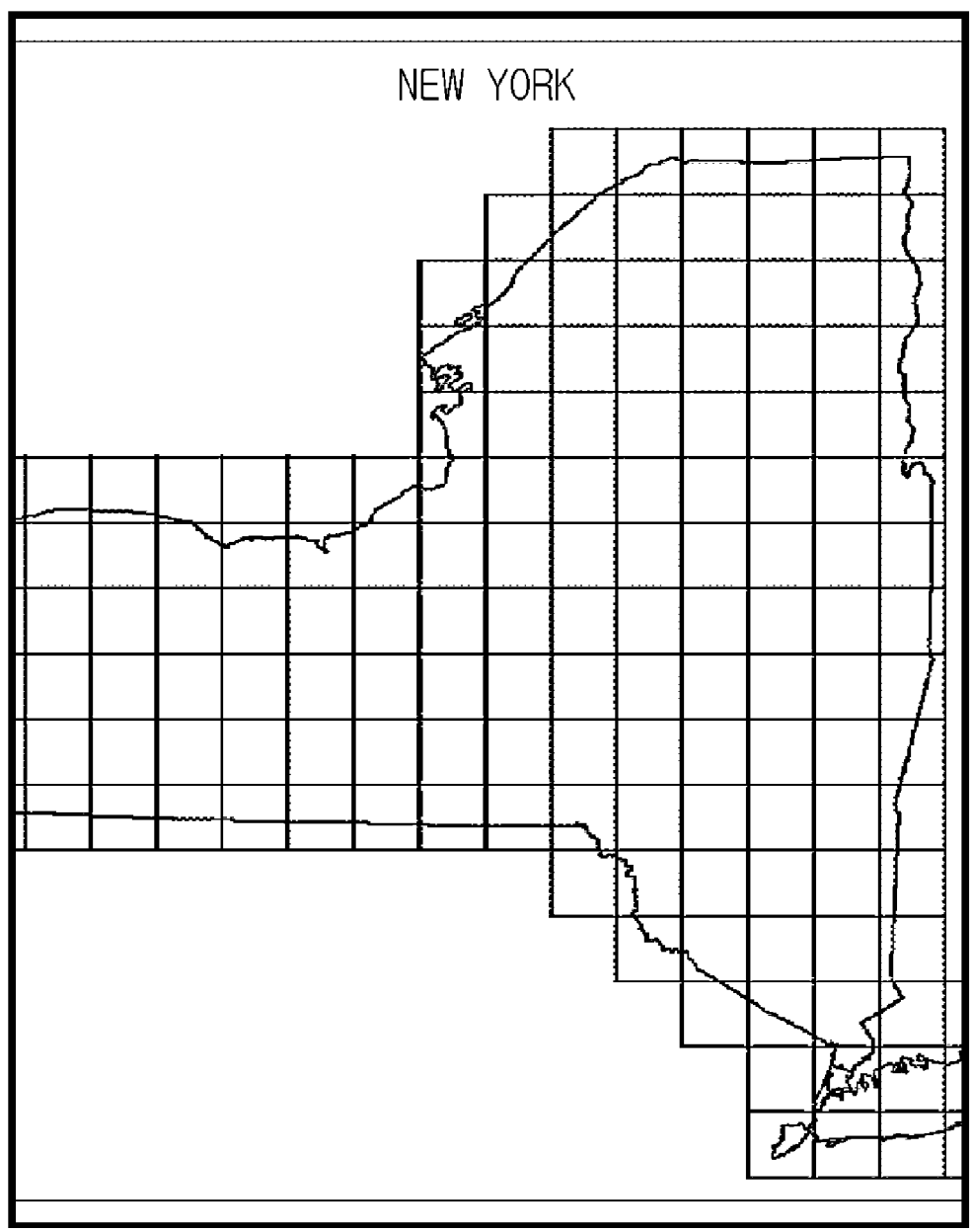
FIG. 2 shows one example of sorting landmarks according to one embodiment of the present invention.

FIG. 2 is a view showing an example of sectionalizing landmarks in step S10. Referring to FIG. 2, for example, with New York divided into sectors having a predetermined size, scoring landmarks for each sector was performed. In scoring, the frequency of digital images for each sector was extracted. A sector having high frequency is a highly scored region, i.e. a section having lots of digital images produced by tourists.

Scoring landmarks for each sector may be represented by Equation 1:

$$LS(\text{region}) = \frac{|(photo_{loc} : loc \in \text{region})|}{\forall \, photo} \times \frac{N(user_{region})}{N(user)}$$

In other words, the landmark score LS for a region may be represented by the product of a factor corresponding to a ratio of digital images photographed in each sector (region) to total digital images (photos) and a factor corresponding to a ratio of users having visited the region to total users. As such, when one user has produced lots of digital images in that place, the ratio of users is taken into account, thereby making it possible to prevent landmarks in a certain place from being highly scored.

Next, the weight of each item of the user profile is analyzed. Here, an item of the user profile having the greatest effect on landmark scoring is determined. As described above, the user profile, i.e. items including information on a user home address, a season to visit, and a time of day to visit, are prioritized.

First, landmark data of an area obtained after step S10 of dividing the area into sectors are randomly divided into halves (D10). In step D10, the landmark data of the area are divided at random into training set data and test set data.

Then, the frequency of images in the training set data is analyzed (D20) and the frequency of images in the test set data is analyzed (D30), followed by measurement of similarity between the training set data and the test set data (D40).

Table 1 shows similarity between the training set data and the test set data according to season information of the user profile.

TABLE 1

| | Season | Training Set | | | |
| | | Spring | Summer | Fall | Winter |
|---|---|---|---|---|---|
| Test Set | Spring | 0.9645 | 0.5799 | 0.5159 | 0.6091 |
| | Summer | 0.5762 | 0.9593 | 0.5151 | 0.5321 |
| | Fall | 0.5174 | 0.5258 | 0.9590 | 0.5940 |
| | Winter | 0.5913 | 0.5406 | 0.5897 | 0.9535 |

Referring to Table 1, the training set and test set data exhibited a similarity of 95% or higher, when matched based on season, whereas the training set and test set data exhibited a similarity of 50% to 60%, when not matched based on season. Thus, it can be seen that it is desirable that information on a season to visit be considered in proposing landmarks.

TABLE 2

| | Time | Training Set | | | |
| | | Morning | Afternoon | Evening | Night |
|---|---|---|---|---|---|
| Test Set | Morning | 0.9371 | 0.5853 | 0.4727 | 0.3753 |
| | Afternoon | 0.5997 | 0.9683 | 0.5872 | 0.4542 |
| | Evening | 0.4847 | 0.5814 | 0.9657 | 0.5537 |
| | Night | 0.3728 | 0.4306 | 0.5364 | 0.9419 |

Referring to Table 2, the training set and test set data exhibited a similarity of 93% or higher, when matched based on time of day, whereas the training set and test set data exhibited a similarity of 37% to 60%, when not matched based on time of day. Thus, it can be seen that it is desirable that information on a time of day to visit the area be considered in proposing landmarks.

Similarly, for information on a user home address, when a user visiting New York is a New York resident, a high number of landmarks were measured in the suburbs of New York, whereas, when a user visiting New York is a foreigner, a high number of landmarks were measured in the center of New York. Thus, it can be seen that residence information must be considered, since a landmark score varies depending upon a home address of the user, i.e. whether the user is a foreigner or not.

As described above, in step D40, similarity according to each item of the user profile is measured to prioritize the items of the user profile in terms of effect on landmark scoring.

Then, landmarks suitable for the user are prioritized and selected. First, based on landmarks of the area obtained in step S20, digital images according to the user profile are grouped (L10). Next, a landmark score vector is produced from the training set data (L20). Equation 2 represents a landmark score vector produced according to the user profile.

$$LM(h, s, d) = \left( L\hat{S}_{hom}(h) \mid L\hat{S}_{sea}(h) \mid L\hat{S}_{pod}(h) \right) \cdot \begin{pmatrix} \frac{w_{hom}}{w_{hom} + w_{sea} + w_{pod}} \\ \frac{w_{sea}}{w_{hom} + w_{sea} + w_{pod}} \\ \frac{w_{pod}}{w_{hom} + w_{sea} + w_{pod}} \end{pmatrix}$$

[Equation 2]

As described above, landmarks according to the user profile may be obtained by multiplication of a landmark score function according to a user home address (hom=home), a landmark score function according to a season to visit (sea=season) and a landmark score function according to a time of day to visit (pod=part of a day) with a weight vector of the user profile.

Thus, the landmark data have information on the weight of the user profile. In step L30, landmark results derived based on the frequency of digital images of an area for a user to visit are weighted by the weight value of the user profile as described above, thereby scoring landmarks. Then, landmarks corresponding to a user input value are prioritized.

Next, the method according to the embodiment may include clustering the landmark results determined in step L30.

After step L30, in step K10, spots similar to each of the derived landmarks are retrieved. For example, retrieval of the spots may be performed when a user inputs a travel spot and a travel time to a user interface. When the user inputs a travel time, the user is further proposed spots scored higher than or equal to a predetermined value in comparison with scores of landmarks selected to be suitable for the user.

In the method according to the embodiment, an algorithm for clustering landmarks is as follows.

First, an empty set is added to a cluster value, followed by sorting a list of scored landmark data. Then, whether, from the uppermost data of the list L, the $j^{th}$ landmark data belong to a specific cluster is determined. If the $j^{th}$ landmark data is included in the specific cluster, whether the $j+1^{th}$ landmark data belong to the specific cluster is determined.

Then, the $i^{th}$ landmark data are extracted. If similarity between the $i^{th}$ landmark data and the $i^{th}$ landmark date with respect to the user profile is higher than or equal to a predetermined threshold value, the $i^{th}$ and $j^{th}$ landmark data values are put into the cluster value. Thus, the cluster value may include a set of combined landmark data.

Then, in step K20, neighborhood spots proposed to a user as landmarks clustered near the selected landmarks are added.

In step K30, the landmarks are combined with one another and at least one clustered landmark result worth visiting is proposed to a user. Table 3 shows one example of clustered landmark results proposed to a user according to the user profile, as described above.

TABLE 3

| Rank | Baseline | Home address | |
|---|---|---|---|
| Rank | Baseline | New York | Other |
| 1 | Empire State Building (Madison square) | Brooklyn | Empire State Building (Madison square) |
| 2 | Times Square (Wall Street) | Union Square (Washington Sq. Park) | Rockefeller Center (Statue of Liberty) |
| 3 | Rockefeller Center (Statue of Liberty) | Jersey City | Time Square (Wall Street) |
| 4 | MOMA | 4th Avenue | Metropolitan Museum |
| 5 | Union Square (Washington Sq. Park) | Green Wood Cemetery | MOMA |

TABLE 4

| Rank | Baseline | Season | | | |
|---|---|---|---|---|---|
| Rank | Baseline | Spring | Summer | Fall | Winter |
| 1 | Empire State Building (Madison square) | Union Square (Washington Sq. Park) | McCarren Park Pool | 4th Avenue | Rockefeller Center (Statue of Liberty) |
| 2 | Times Square (Wall Street) | MOMA | MOMA | Empire State Building (Madison square) | Times Square (Wall Street) |
| 3 | Rockefeller Center (Statue of Liberty) | Museum of Natural History | Times Square (Wall Street) | Rockefeller Center (Statue of Liberty) | Times Square (Wall Street) |

TABLE 4-continued

| Rank | Baseline | Season | | | |
| --- | --- | --- | --- | --- | --- |
| Rank | Baseline | Spring | Summer | Fall | Winter |
| 4 | MOMA | Empire State Building (Madison square) | Empire State Building (Madison square) | New York Anime Festival | Metropolitan Museum |
| 5 | Union Square (Washington Sq. Park) | Times Square (Wall Street) | Metropolitan Museum | MOMA | Madison Square Garden |

TABLE 5

| Rank | Baseline | Time of day | | | |
| --- | --- | --- | --- | --- | --- |
| Rank | Baseline | Morning | Afternoon | Evening | Night |
| 1 | Empire State Building (Madison square) | 4th Avenue | MOMA | Empire State Building (Madison square) | Times Square (Wall Street) |
| 2 | Times Square (Wall Street) | Empire State Building (Madison square) | Union Square (Washington Sq. Park) | Times Square (Wall Street) | Rockefeller Center (Statue of Liberty) |
| 3 | Rockefeller Center (Statue of Liberty) | Rockefeller Center (Statue of Liberty) | Museum of Natural History | Madison Square Garden | Nokia Theater (Broadway) |
| 4 | MOMA | Empire State Building (Madison square) | Empire State Building (Madison square) | Rockefeller Center (Statue of Liberty) | Broadway |
| 5 | Union Square (Washington Sq. Park) | Times Square (Wall Street) | Metropolitan Museum | Metropolitan Museum | Empire State Building (Madison square) |

Figure 3:
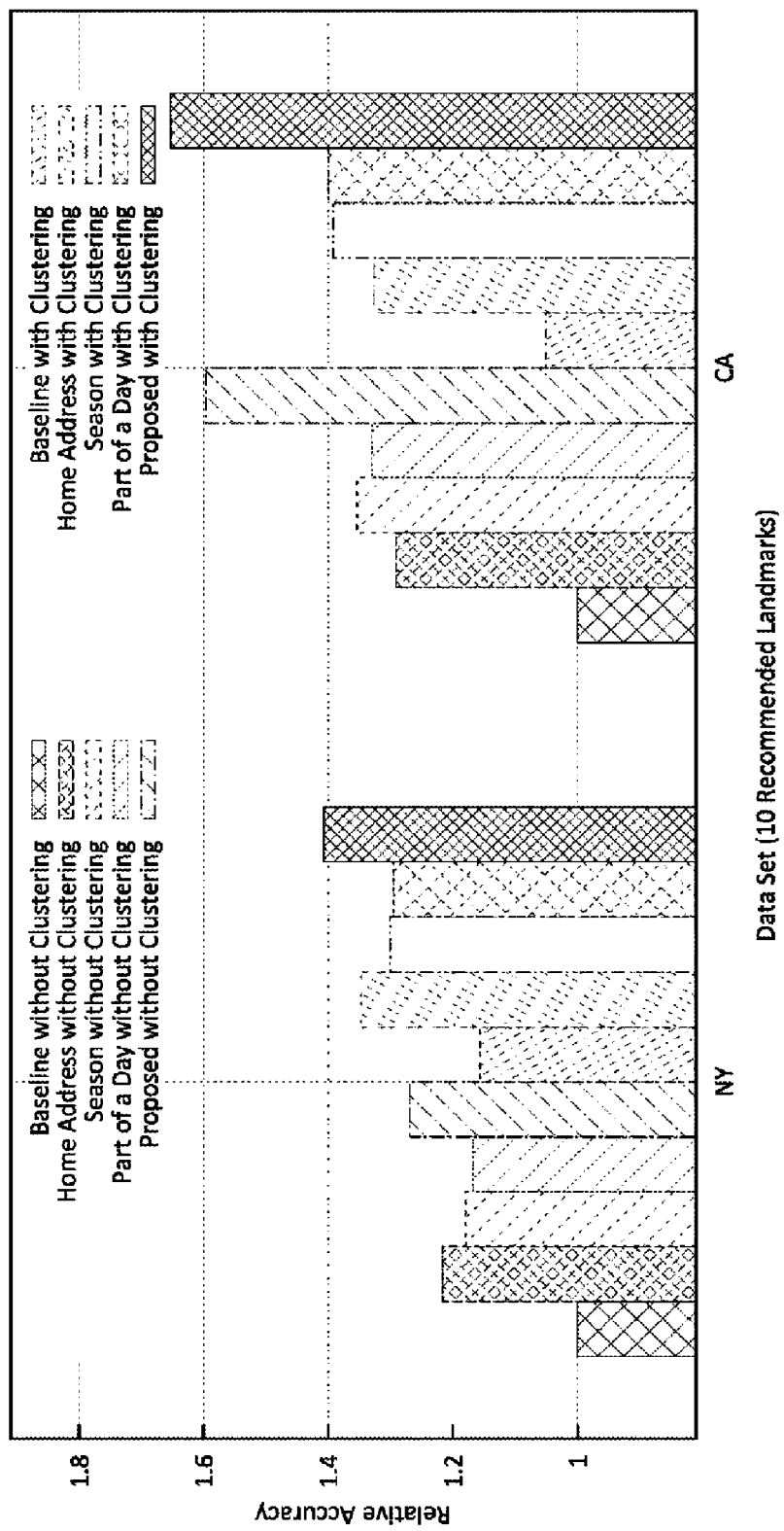
FIG. 3 is a graph showing relative accuracy of landmarks according to one embodiment of the present invention.

Referring to Tables 3 to 5, there are shown landmark results (baseline) without considering the user profile and landmark results according to the user profile (home address, season, time of day). Specifically, there are shown clustered landmarks including a further proposed neighborhood spot. As shown in FIG. 3, priorities of landmarks proposed to a user vary depending upon conditions of the user profile.

As shown in Table 3, the method according to the embodiment of the invention allows a user to be proposed spots with a highly scored landmark according to season. For example, in summer, a swimming pool such as McCarren Park Pool is proposed, and, in fall, $4^{th}$ Avenue holding various events, such as festivities, is proposed to the user, thereby allowing the user to enjoy much more traveling experiences when selecting travel spots.

FIG. 3 is a graph evaluating accuracy of a landmark metamodel. Accuracy evaluation is performed using cross validation. Specifically, experimental values in a specific section are removed from the entire experimental data having been used to produce a metamodel to reconstruct the metamodel, followed by calculating prediction values corresponding to the removed experimental values, thereby evaluating the accuracy of the metamodel based on difference in the prediction values and the removed experimental values.

Referring to FIG. 3, with landmark results not given the user profile fixed to 1, accuracy for each of the user profiles was analyzed. To use the metamodel as described above, information on digital images uploaded by a person having returned from travel and information on places proposed by her/him were assumed to be unknown, and results obtained using the method according to the embodiment were compared therewith.

As shown in FIG. 3, landmark results given the user profile and finally proposed results exhibited an accuracy greater than or equal to 1.2 times, and clustered results exhibited an accuracy of 1.6 times or move. Therefore, the method for proposing landmarks according to the embodiment of the invention can be evaluated to provide proposed spots with high reliability to a user.

As such, according to the embodiment, when planning a trip, a user can be proposed travel spots which are suitable for user travel conditions and are considered as landmarks in an area to visit without need for retrieval of information from a vast database.

In addition, searching travel spots based on a user profile allows a user to be proposed places containing contents worth seeing for foreign visitors when planning an overseas trip; preferentially proposed places holding various events, such as festivities or sporting events, based on a season to visit; and preferentially proposed places with a wonderful night view, and the like, based on a time of day to visit.

Furthermore, the method according to the embodiment has an advantage in that the user can be proposed other landmarks with a similar concept, distributed near the proposed landmarks, thereby allowing the user to visit all of the proposed landmarks within a given travel time.

Although the present invention has been described with reference to some exemplary embodiments, it should be understood that the foregoing embodiments are provided for illustration only and are not to be construed in any way as limiting the present invention, and that various modifications, changes, alterations, and equivalent embodiments can be made by those skilled in the art without departing from the spirit and scope of the invention. Therefore, the scope of the invention should be limited only by the accompanying claims and equivalents thereof.

What is claimed is:

1. A method for proposing landmarks, comprising:
   extracting landmarks in a country or area from digital images photographed in the country or the area;
   clustering the extract landmarks to produce clustered landmarks, comprising:
     analyzing the extracted landmarks for a weight of each item of a profile of the digital images;
     prioritizing landmarks based on the weight of each item of the profile of the digital images,
     wherein the items of digital images comprises at least one of a home address of a person who took the digital images, a season in which the digital images were taken, or a time of day in which the digital image were taken; and
   proposing landmarks from the clustered landmarks to a user planning a trip based on items in a profile of the user,
   wherein the items in the profile of the user comprise at least one of a user home address, a season in which the trip is scheduled, or a time of day in which the trip is scheduled.

2. The method according to claim 1, wherein extracting landmarks in a country or area comprises:
   dividing the country or the area into sectors having a predetermined size; and
   performing landmark scoring based on the frequency of the extracted digital images for each sector.

3. The method according to claim 2, wherein landmark scoring is performed based on the product of a factor corresponding to a ratio of digital images photographed in each sector to total digital images and a factor corresponding to a ratio of users having visited the sector to total users.

4. The method according to claim 1, wherein analyzing the extracted landmarks for the weight of each item of the profile of the digital image comprises:
   randomly dividing the landmarks derived from the digital images into two groups to measure similarity of the user profiles of the groups; and
   prioritizing the items of the user profile based on the similarity.

5. The method according to claim 1, wherein prioritizing landmarks based on the weight of each item of the profile of the digital image is performed based on a landmark score vector according to the profile of the digital image.

6. The method according to claim 5, wherein the landmark score vector is derived by multiplication of a landmark score function according to the home address of the person who took the digital images, a landmark score function according to the season in which the digital images were taken, and a landmark score function according to the time of day in which the digital image were taken with a weight vector of the profile of the digital image.

7. The method according to claim 1, wherein clustering the extracted landmarks to produce clustered landmarks comprises:
   adding an empty set to a cluster value, and sorting a list of scored landmark data;
   determining whether, from the uppermost data, the $j^{th}$ landmark data belong to a specific cluster; and
   extracting the $i^{th}$ landmark data and, if similarity between the $i^{th}$ landmark data and the $j^{th}$ landmark data with respect to the profile of the digital image is higher than or equal to a predetermined threshold value, putting the $i^{th}$ and $j^{th}$ landmark data values into the cluster value.

8. The method according to claim 7, wherein, if the $j^{th}$ landmark data belong to a specific cluster, whether the $j+1^{th}$ landmark data belong to the specific cluster is determined.

9. The method according to claim 1, wherein the digital images comprise geo-tags containing information, such as a place and time at which the digital images were photographed, and a server associated with SNS is built as a database to extract the digital images.

* * * * *